US008598494B2

(12) United States Patent
Santacatterina et al.

(10) Patent No.: US 8,598,494 B2

(45) Date of Patent: Dec. 3, 2013

(54) METHOD FOR CONTROLLING POWER SUPPLY TO THE LIQUID CONTENTS OF A COOKING VESSEL

(75) Inventors: Gianpiero Santacatterina, Sangiano (IT); Jurij Paderno, Noate Milanese (IT); Francesco Del Bello, Rome (IT)

(73) Assignee: Whirlpool Corporation, Benton Harbor, MI (US)

( * ) Notice: Subject to any disclaimer, the term of this patent is extended or adjusted under 35 U.S.C. 154(b) by 39 days.

(21) Appl. No.: 12/897,055

(22) Filed: Oct. 4, 2010

(65) Prior Publication Data

US 2011/0089156 A1 Apr. 21, 2011

(30) Foreign Application Priority Data

Oct. 19, 2009 (EP) .................................... 09173373

(51) Int. Cl.
*F27D 11/00* (2006.01)
*A47J 27/00* (2006.01)

(52) U.S. Cl.
USPC ........... 219/442; 219/441; 219/492; 219/497; 219/494; 219/501; 219/508; 219/481; 340/540; 340/603; 340/526; 99/330; 99/331

(58) Field of Classification Search
USPC ................. 219/492, 497, 494, 501, 508, 481, 219/441–442; 340/540, 603, 526; 99/330–331
See application file for complete search history.

(56) References Cited

U.S. PATENT DOCUMENTS

| | | | | |
|---|---|---|---|---|
| 6,118,104 | A * | 9/2000 | Berkcan et al. | 219/494 |
| 6,469,282 | B1 | 10/2002 | Roberts | |
| 7,573,005 | B2 * | 8/2009 | Clothier | 219/497 |
| 2005/0247696 | A1 | 11/2005 | Clothier | |
| 2006/0081607 | A1 * | 4/2006 | Niiyama et al. | 219/497 |

FOREIGN PATENT DOCUMENTS

| | | | |
|---|---|---|---|
| EP | 1378807 | A2 | 1/2004 |
| JP | 11132471 | A | 5/1999 |
| JP | 2006064273 | A | 3/2006 |
| JP | 2007139303 | A | 6/2007 |

* cited by examiner

*Primary Examiner* — Shawntina Fuqua

(57) ABSTRACT

A method for controlling power supply to the liquid contents of a cooking vessel or the like, particularly for controlling the electrical power supply in an induction heating system, wherein a predetermined thermodynamic state is detected and the user is alerted, comprises maintaining a predetermined high power condition after reaching the predetermined thermodynamic state for a predetermined time and then reducing the power supply to a predetermined level.

10 Claims, 2 Drawing Sheets

METHOD FOR CONTROLLING POWER SUPPLY TO THE LIQUID CONTENTS OF A COOKING VESSEL

BACKGROUND OF THE INVENTION

1. Field of the Invention

The present invention relates to a method for controlling power supply to a cooking vessel and the liquid contents thereof, particularly for controlling the electrical power supply in an induction heating system, wherein a predetermined thermodynamic condition, for instance the start of boiling, is detected and the user is alerted.

2. Description of the Related Art

In the technical field of cooking appliances it is well known how to detect the boiling of water and to detect a boil dry condition. Known methods are disclosed in EP 1378807 and U.S. Pat. No. 6,469,282.

Previous methods as disclosed by such documents or used in the market just detect the boiling of water and signal it to the user. If the power is reduced just after the boil detection, the boil conditions deteriorate due to the insertion of food and it takes time for water to boil again. If the power level is never reduced, an excessive amount of steam is produced and too much of energy is spent for a task that could be done by spending much less energy. In order to have an optimum arrangement of power level during cooking, it is required a control system capable of delivering an high power level in order to reduce time for reaching boiling and then reducing the power level when a higher power level is no longer necessary.

SUMMARY OF THE INVENTION

It is therefore an object of the present invention to provide a method for controlling power and a control system which is capable of solving the above technical problem. It is a further object of the present invention to provide a control system that is to be used preferably in induction cook tops to detect boiling of water, to show the user the duration of boiling, to save energy and to avoid extreme and fast vaporization of water. This is obtained thanks to the features listed in the appended claims.

According to the invention, the control system not only detects when the liquid (for instance water) inside the pot boils and warns the user by means of a sound and/or visual signal, rather it then gives the user some time to insert the food, re-boils the water inside the pot and then reduces the power to a certain level for the rest of the cooking period.

Even if the system is preferably used in induction heating systems for cooking appliances, it can be used for every kind of electric or gas cooking appliance (cooktops or ovens). Moreover the system and the method according to the invention is independent on the specific system or method used for detecting the boiling condition that can be done, for instance, by means of temperature sensors or by detecting the behavior of one or more parameters of a resonant circuit.

BRIEF DESCRIPTION OF THE DRAWINGS

Further advantages and features of a method and system according to the present invention will be clear from the following detailed description, provided as a non limiting example, with reference to the attached drawings in which.

DETAILED DESCRIPTION OF THE PREFERRED EMBODIMENTS

Figure 1:
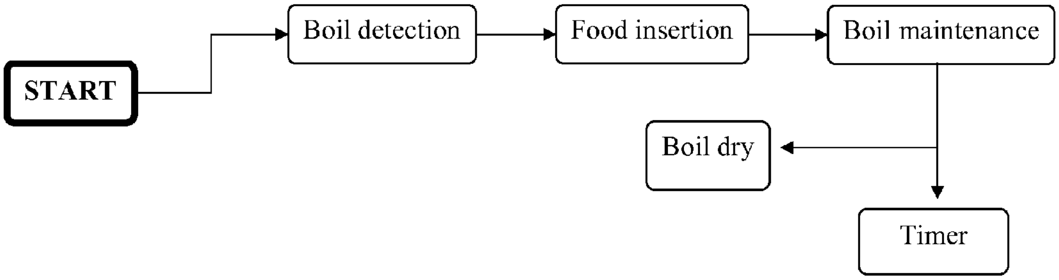
FIG. 1 is a block diagram showing the boiling control procedure according to the invention.
Figure 2:
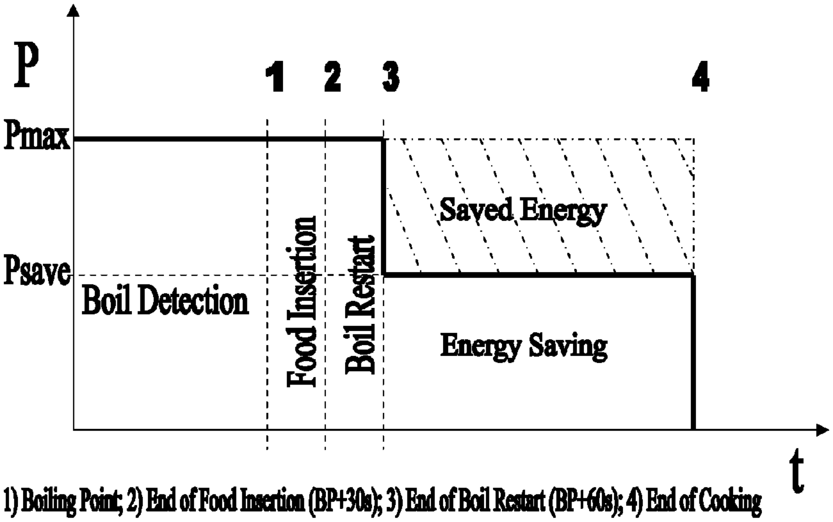
FIG. 2 is a power vs. time diagram showing a boil detection and maintenance control procedure according to a first embodiment of the present invention.

The control procedure according to the present invention is formed up of four main phases (FIG. 2):

Phase 1—Boil Detection: The pot containing water is placed on the cook top and the coil is selected. A specific "sense function" button on the user interface is pressed. By this selection the cook top is driven according to the invention. Then the cook top starts working at a predetermined high power level and the control system is activated automatically to detect the boiling of water. When it boils, the control system informs the user by means of a sound and/or visual signal. Another possible implementation of this invention can avoid the selection of the coil if it's clear for the user which of the coils of the cook top the "sense function" button is referring to. This can be achieved for instance having a specific button for each coil or stating that the function is referred to the last coil used by the customer.

Phase 2—Food Insertion: At this step the control system keeps the high power level for a predetermined time, for instance 30 seconds. This period is assumed to be the necessary time for the user to insert the food into the pot after he has been alerted that a boiling condition was reached.

Phase 3—Boiling Restart: At the end of the food insertion period, the cook top continues at the high power level for a predetermined period of time (for instance 30 second), for boiling restart. At the end of the food insertion phase a further sound and/or visual signal may be given to the user in order to inform him that a new phase is started. During this period, the boiling condition that is changed by the insertion of food (loss of boiling due to quick cooling by insertion of food) is rapidly recovered by keeping the power at the high level.

Phase 4—Energy Saving: At the end of the boiling restart, another signal (for instance a sound) is preferably given and at the same time the power is reduced to a level that is predetermined according to a set of parameters such as the dimension of the hob, until another power level is inserted by the user or the boil dry condition is detected. This reduced power level may be a fixed one, for instance around 50% of the previous high power, or it can be automatically adjusted on the basis of working parameters or parameters set by the user. This reduced power value can be also varied according to a predetermined pattern. This is used to avoid the extreme vaporization of water and to obtain the necessary cooking conditions with a much lower level of energy consumption, thus saving energy.

In addition to these control procedures, the method according to the invention comprises a timer feature according to which a time counter on the user interface is automatically activated for measuring the cooking time from the beginning of boiling restart period. By this way, the cook top enables the user to know for how long the food is actually cooked.

The method according to the invention has the following advantages:

It helps the user by boil detection feature.

It keeps the user informed about the timing of boiling, food insertion and boiling restart.

It saves energy and time by using a high power level to recover the boiling condition after the food is inserted.

It saves energy by the power reducing feature at the end of boiling restart period.

It avoids boil dry condition by alerting the user.

Figure 3:
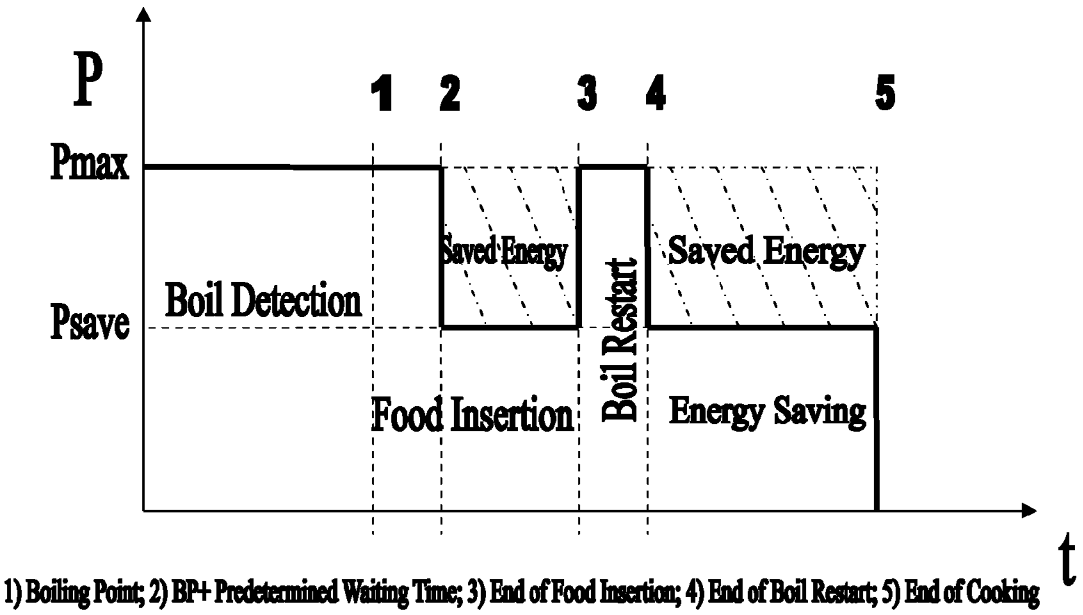
FIG. 3 is similar to FIG. 2 and relates to a second embodiment of the present invention.

Even if in the above embodiment a predetermined set of functions and values of parameters is fixed, it is possible to provide a more developed control system which would have the flexibility among the different phases deciding the waiting time, cooking time, required power level and duration, etc. itself. For example, the periods for food insertion and boiling restart, which according to the above first embodiment are fixed at e.g. 30 seconds each, can be adjusted in a flexible way by reducing, in food insertion phase, the power to a certain level after some time if the food is not actually inserted, until detecting the actual insertion of food in Phase 2 and increasing the power to a high level until the water re-boils in Phase 3. This flexibility would increase both the energy saving and the food insertion time flexibility for the user. The above methodology is shown in FIG. 3, where the actual food insertion may be automatically sensed by the cook top due e.g. to a loss of boiling condition (by using therefore the same known methodology for detecting boiling). In addition, the method according to the invention is not limited to induction cook tops but it can be used in cooking appliances with any other source of energy.

Furthermore, a selection feature can be added to the cook top to control also the duration of cooking in Phase 4. With insertion of data about the food to be cooked by the user, the cook top may be able to determine automatically the cooking time and to turn off at the end of this period. For instance, if the food to be cooked is “spaghetti”, the user can select spaghetti on the cook top menu which includes the data for different kinds of food in its database and the cooking time will be selected as for instance eight minutes automatically.

Even if up to now a method for controlling water boiling has been described, nevertheless the present invention can be used for controlling the thermal status of other liquids different from water. By modifying the detection criteria, any other liquid ingredient can be used such as oil or juice. For example, the boil detection criteria can be changed with temperature detection of, say 180° C., for the use of oil to cook French fries.

The invention claimed is:

1. A method for controlling power supplied to liquid contents of a cooking vessel during a cooking operation comprising:

controlling an electrical power supply in a heating system;

automatically detecting a first predetermined thermodynamic state associated with the liquid contents;

alerting a user when the first predetermined thermodynamic state is detected;

maintaining a high power condition after reaching said first predetermined thermodynamic state for a predetermined period of time; and subsequently, automatically reducing the electrical power supply to a predetermined level below the high power condition.

2. The method according to claim 1, wherein the first predetermined thermodynamic state constitutes when the liquid contents starts to boil.

3. The method according to claim 1, wherein the first predetermined thermodynamic state is a predetermined temperature.

4. The method according to claim 1, further comprising: reducing the electrical power supply according to a predetermined pattern.

5. The method according to claim 1, further comprising: detecting an introduction of food into the cooking vessel before maintaining the high power condition.

6. A method for controlling power supplied to liquid contents of a cooking vessel during a cooking operation comprising:

controlling an electrical power supply in a heating system;

automatically detecting a first predetermined thermodynamic state associated with the liquid contents;

alerting a user when the first predetermined thermodynamic state is detected;

detecting an introduction of food into the cooking vessel;

maintaining a high power condition after the introduction of food into the cooking vessel and after reaching said first predetermined thermodynamic state for a predetermined period of time;

subsequently, automatically reducing the electrical power supply to a predetermined level below the high power condition;

detecting a second predetermined thermodynamic state of the liquid contents;

counting time starting from reaching the second predetermined thermodynamic state to generate a counted time; and displaying the counted time to the user.

7. The method according to claim 6, further comprising: alerting the user when the second predetermined thermodynamic state is reached.

8. The method according to claim 6, further comprising: interrupting the electrical power supply at a certain predetermined time, after the second predetermined thermodynamic state is reached, according to data selected by the user.

9. The method according to claim 1, wherein the predetermined time period is a time period necessary for the user to insert food into the cooking vessel.

10. The method according to claim 1, wherein the predetermined period of time is thirty seconds.

* * * * *